US012062316B2

(12) United States Patent
Kim

(10) Patent No.: US 12,062,316 B2
(45) Date of Patent: Aug. 13, 2024

(54) DISPLAY DRIVING CIRCUIT AND FREQUENCY CORRECTION METHOD OF DISPLAY DRIVING CIRCUIT

(71) Applicant: LX SEMICON CO., LTD., Daejeon (KR)

(72) Inventor: Hyeong Seok Kim, Daejeon (KR)

(73) Assignee: LX SEMICON CO., LTD., Daejeon (KR)

(*) Notice: Subject to any disclaimer, the term of this patent is extended or adjusted under 35 U.S.C. 154(b) by 0 days.

(21) Appl. No.: 18/320,669

(22) Filed: May 19, 2023

(65) Prior Publication Data

US 2023/0290294 A1 Sep. 14, 2023

Related U.S. Application Data

(63) Continuation of application No. 17/550,430, filed on Dec. 14, 2021, now Pat. No. 11,694,598.

(30) Foreign Application Priority Data

Dec. 18, 2020 (KR) ........................ 10-2020-0179027

(51) Int. Cl.
*G09G 3/20* (2006.01)
*G09G 5/00* (2006.01)

(52) U.S. Cl.
CPC ........... *G09G 3/2092* (2013.01); *G09G 5/008* (2013.01); *G09G 2310/08* (2013.01); *G09G 2320/064* (2013.01); *G09G 2320/0693* (2013.01)

(58) Field of Classification Search
CPC .. G09G 3/2092; G09G 5/008; G09G 2310/08; G09G 2320/064; G09G 2320/0693
See application file for complete search history.

(56) References Cited

U.S. PATENT DOCUMENTS

| | | | | |
|---|---|---|---|---|
| 9,466,263 | B2 | 10/2016 | Bae et al. | |
| 10,269,292 | B2 * | 4/2019 | Bae | G09G 3/3225 |
| 10,796,661 | B2 | 10/2020 | Park | |
| 10,943,559 | B2 | 3/2021 | Park | |
| 11,694,598 | B2 * | 7/2023 | Kim | G09G 5/008 345/55 |
| 2014/0333608 | A1 | 11/2014 | Okairi et al. | |
| 2014/0368479 | A1 | 12/2014 | Bae et al. | |
| 2016/0070294 | A1 | 3/2016 | Chung et al. | |
| 2017/0011683 | A1 * | 1/2017 | Bae | G09G 5/18 |
| 2020/0074958 | A1 | 3/2020 | Park | |
| 2020/0118517 | A1 | 4/2020 | Park | |
| 2022/0198988 | A1 * | 6/2022 | Kim | G09G 3/2092 |
| 2023/0290294 | A1 * | 9/2023 | Kim | G09G 3/2092 |

FOREIGN PATENT DOCUMENTS

| | | | |
|---|---|---|---|
| JP | 6208975 | B2 | 10/2017 |
| JP | 6274638 | B2 | 2/2018 |
| KR | 10-2071573 | B1 | 3/2020 |
| KR | 10-2020-0041406 | A | 4/2020 |

* cited by examiner

*Primary Examiner* — Michael J Jansen, II
(74) *Attorney, Agent, or Firm* — ROTHWELL, FIGG, ERNST & MANBECK, P.C.

(57) ABSTRACT

Disclosed are a display driving circuit and a frequency correction method of the display driving circuit, capable of quickly correcting a frequency change of a clock signal when a display device is driven at a low scan rate.

19 Claims, 4 Drawing Sheets

DISPLAY DRIVING CIRCUIT AND FREQUENCY CORRECTION METHOD OF DISPLAY DRIVING CIRCUIT

CROSS REFERENCE TO RELATED APPLICATION

This application is a continuation application of U.S. patent application Ser. No. 17/550,430 filed on Dec. 14, 2021, which claims priority from Korean Patent Application No. 10-2020-0179027, filed on Dec. 18, 2020, which are hereby incorporated by reference in their entirety for all purposes as if fully set forth herein.

BACKGROUND

1. Technical Field

Various embodiments generally relate to a display driving circuit which corrects a frequency change of an oscillator, and a frequency correction method of the display driving circuit.

2. Related Art

With the development of informatization technology, the market for display devices as connection media between users and information has been growing. Accordingly, there has been increasing use of the display devices such as organic light emitting displays (OLEDs).

The display device may include a display panel and a display driving circuit which drives the display panel.

In general, the display driving circuit may operate according to a scan rate, and the scan rate may be maintained by a clock signal of an oscillator included in the display driving circuit.

A frequency of the clock signal may change by an environmental factor such as a temperature variation of the oscillator. The frequency change of the clock signal may result in image quality degradation in the display device.

Therefore, in order to quickly improve image quality, the display driving circuit should periodically check and correct the frequency change of the clock signal.

The display driving circuit may receive image data from a host such as an application processor (AP), a central processing unit (CPU) and a graphics processing unit (GPU), and may receive, from the host, a vertical synchronizing signal, a horizontal synchronizing signal and a data enable signal for displaying the image data on the display panel.

In the conventional art, the display driving circuit corrects the frequency change of the clock signal according to a period of the vertical synchronizing signal.

Recently, a technology of changing a scan rate has been applied to the display device in order to reduce the power consumption of the display device.

For example, the scan rate may be set to 60 Hz when the display device displays a moving image, and may be changed to 1 Hz or 10 Hz when the display device displays a still image.

If the scan rate of the display device is changed to a low scan rate such as 1 Hz or 10 Hz, the period of the vertical synchronizing signal increases accordingly.

If the period of the vertical synchronizing signal increases, a time required for correcting the frequency change of the clock signal in the display driving circuit also increases. Accordingly, it is not possible to quickly resolve the degradation in the image quality caused by the frequency change of the clock signal.

SUMMARY

Under such a background, in one aspect, various embodiments are directed to providing a technology which quickly corrects a frequency change of a clock signal when a display device is driven at a low scan rate.

In one aspect, an embodiment may provide a display driving circuit including: an oscillator configured to generate an oscillator clock signal; a timing controller configured to generate a pulse width modulation (PWM) synchronizing signal by using the oscillator clock signal; and a frequency correction circuit configured to set a correction period for measuring and correcting a frequency deviation between a frequency of the oscillator clock signal and a target frequency, by using the PWM synchronizing signal, generate a correction signal for correcting the frequency deviation based on the correction period, and output the correction signal to the oscillator.

In another aspect, an embodiment may provide a method of correcting a frequency of an oscillator in a display driving circuit, including: generating an oscillator clock signal; generating a pulse width modulation (PWM) synchronizing signal by using the oscillator clock signal; and correcting a frequency of the oscillator clock signal by using the PWM synchronizing signal.

As is apparent from the above description, according to the embodiments, a display driving circuit may correct a frequency change of an oscillator clock signal by using a PWM synchronizing signal as an internal signal with a period shorter than a vertical synchronizing signal received from the external circuit. Therefore, even when a display device is driven at a low scan rate, it is possible to quickly correct the frequency change of the oscillator clock signal.

DETAILED DESCRIPTION

Figure 1:
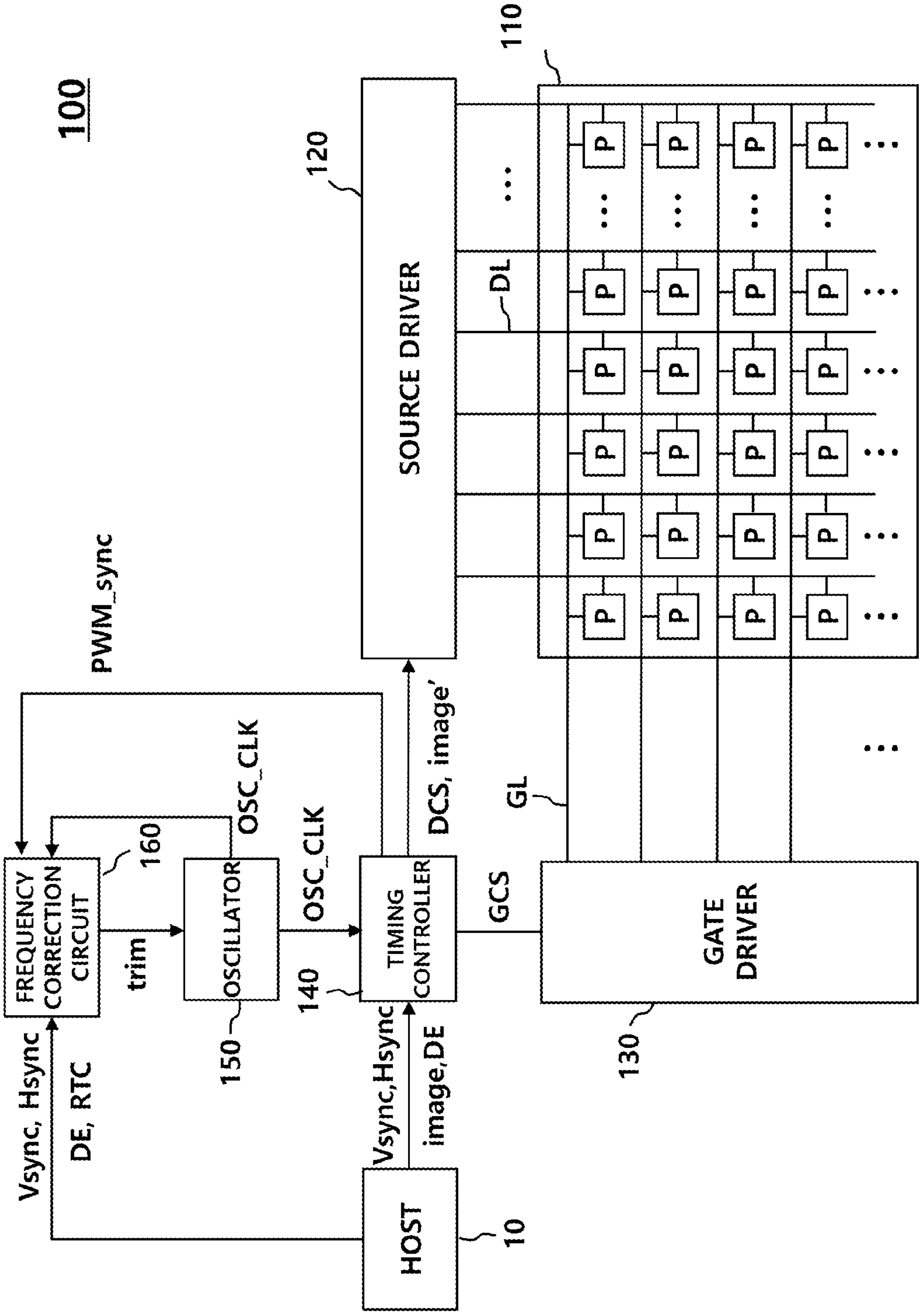
FIG. 1 is a configuration diagram of a display device in accordance with an embodiment.

FIG. 1 is a configuration diagram of a display device in accordance with an embodiment.

Referring to FIG. 1, a display device 100 may include a display panel 110 and a display driving circuit which drives the display panel 110.

A plurality of data lines DL and a plurality of gate lines GL may be disposed in the display panel 110, and a plurality of pixels P may be disposed in the display panel 110. The plurality of pixels P may be disposed in a matrix shape formed by a plurality of rows and a plurality of columns.

The display driving circuit which drives the display panel 110 may include a source driver 120, a gate driver 130, a timing controller 140, an oscillator 150 and a frequency correction circuit 160.

In the display driving circuit, the gate driver 130 may output a scan signal of a turn-on voltage or a turn-off voltage to the gate line GL. When the scan signal of the turn-on voltage is supplied to a pixel P, the corresponding pixel P is connected to the data line DL, and when the scan signal of the turn-off voltage is supplied to a pixel P, the connection between the corresponding pixel P and the data line DL is released.

In the display driving circuit, the source driver 120 supplies a data voltage to the data line DL. The data voltage supplied to the data line DL is transferred to a pixel P which is connected to the data line DL according to the scan signal.

In the display driving circuit, the timing controller 140 may receive a vertical synchronizing signal Vsync, a horizontal synchronizing signal Hsync, a data enable signal DE and an image data image from a host 10. The timing controller 140 may receive an oscillator clock signal OSC_CLK from the oscillator 150. The vertical synchronizing signal Vsync may be a vertical synchronizing signal corresponding to a high scan rate or a vertical synchronizing signal corresponding to a low scan rate.

In other words, the host 10 may change the scan rate of the display device 100, and may adjust a period of the vertical synchronizing signal Vsync according to the scan rate of the display device 100. The scan rate and the period of the vertical synchronizing signal Vsync may be in a proportional relationship. That is, the period of the vertical synchronizing signal Vsync corresponding to a high scan rate may be shorter than the period of the vertical synchronizing signal corresponding to a low scan rate. In general, the high scan rate may be 60 Hz (Hertz) or more and the low scan rate may be 10 Hz or less.

The timing controller 140 may generate a control signal of the gate driver 130 and a control signal of the source driver 120 by using the vertical synchronizing signal Vsync, the horizontal synchronizing signal Hsync, the data enable signal DE and the oscillator clock signal OSC_CLK.

First, the timing controller 140 may generate a gate control signal GCS by using the vertical synchronizing signal Vsync, the horizontal synchronizing signal Hsync, the data enable signal DE and the oscillator clock signal OSC_CLK, and may output the gate control signal GCS to the gate driver 130. The gate control signal GCS may include a gate start pulse (GSP), a gate shift clock (GSC), a gate output enable signal (GOE) and a gate modulation control signal.

The timing controller 140 may convert the image data image, received from the host 10, into image data image' to match a data type used by the source driver 120.

The timing controller 140 may output the converted image data image' to the source driver 120.

The timing controller 140 may generate a data control signal DCS by using the vertical synchronizing signal Vsync, the horizontal synchronizing signal Hsync, the data enable signal DE and the oscillator clock signal OSC_CLK, and may output the data control signal DCS to the source driver 120.

The data control signal DCS may include a source start pulse (SSP), a source shift clock (SSC) and a source output enable signal (SOE).

In an embodiment, the timing controller 140 may generate a pulse width modulation (PWM) synchronizing signal PWM_sync as a signal which is used in adjusting at least one of light emission time and brightness of the pixels P disposed in the display panel 110.

When the gate driver 130 has a function for adjusting light emission time and brightness of the pixels P, the timing controller 140 may output the PWM synchronizing signal PWM_sync to the gate driver 130.

When the display driving circuit includes a separate driver (not illustrated) for adjusting light emission time and brightness of the pixels P, the timing controller 140 may output the PWM synchronizing signal PWM_sync to the separate driver.

The timing controller 140 may output the PWM synchronizing signal PWM_sync to the frequency correction circuit 160 which is to be described below.

The period of the PWM synchronizing signal PWM_sync may be shorter than the period of the vertical synchronizing signal Vsync.

The oscillator 150 may generate the oscillator clock signal OSC_CLK, and may output the oscillator clock signal OSC_CLK to the timing controller 140 and the frequency correction circuit 160.

The oscillator 150 may adjust a frequency of the oscillator clock signal OSC_CLK on the basis of a correction signal trim outputted from the frequency correction circuit 160.

The frequency correction circuit 160 may receive the oscillator clock signal OSC_CLK from the oscillator 150.

The frequency correction circuit 160 may receive the vertical synchronizing signal Vsync, the horizontal synchronizing signal Hsync, the data enable signal DE and a real time clock (RTC) signal from the host 10, and may receive the PWM synchronizing signal PWM_sync from the timing controller 140.

The frequency correction circuit 160 may set a correction period for measuring and correcting a frequency deviation between a target frequency and the frequency of the oscillator clock signal OSC_CLK, by using the PWM synchronizing signal PWM_sync.

The frequency correction circuit 160 may generate the correction signal trim for correcting the frequency deviation on the basis of the correction period, and may output the correction signal trim to the oscillator 150.

A detailed description for this is as follows.

Figure 2:
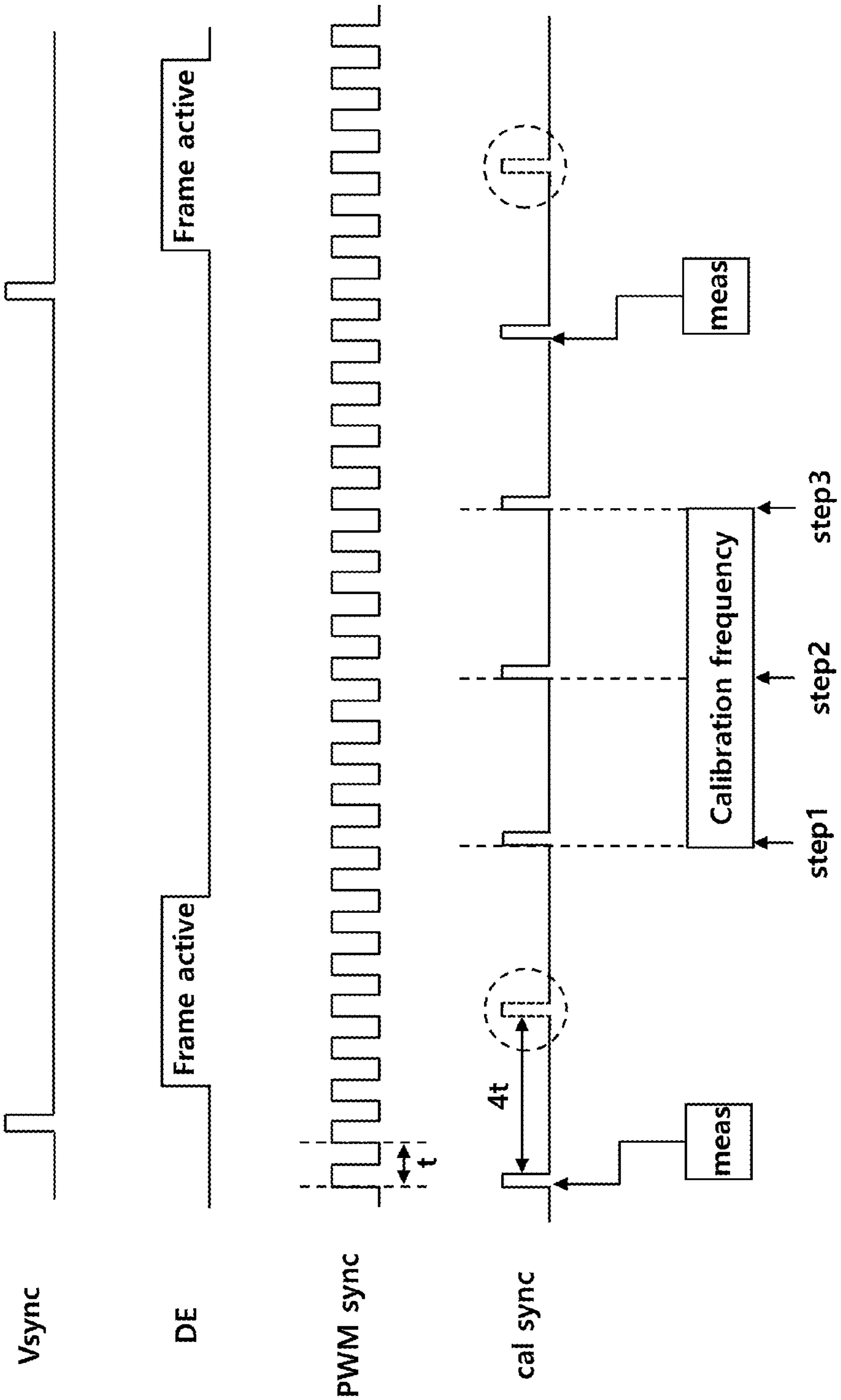
FIGS. 2 and 3 are diagrams to assist in the explanation of a configuration in which a frequency correction circuit in accordance with an embodiment corrects a frequency of an oscillator clock signal.
Figure 3:
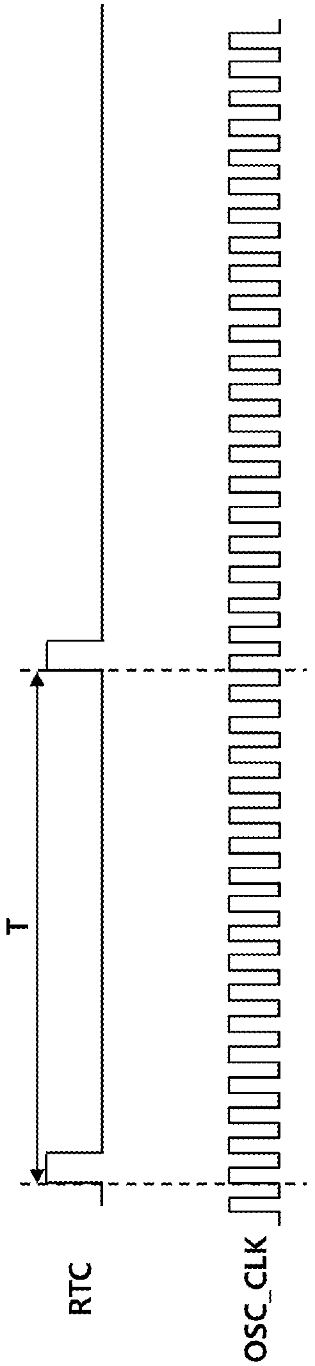

FIGS. 2 and 3 are diagrams to assist in the explanation of a configuration in which a frequency correction circuit in accordance with an embodiment corrects a frequency of an oscillator clock signal.

Referring to FIG. 2, the frequency correction circuit 160 may calculate a period t of the PWM synchronizing signal PWM_sync received from the timing controller 140.

The frequency correction circuit 160 may set, as the correction period, a value which is calculated by multiplying the period t of the PWM synchronizing signal PWM_sync by a natural number equal to or greater than 2.

For example, the frequency correction circuit 160 may set, as the correction period, 4t which is calculated by multiplying the period t of the PWM synchronizing signal PWM_sync by 4.

Through this, the frequency correction circuit 160 may recognize every 4 times of the period t of the PWM synchronizing signal PWM_sync, as a time point at which the correction period arrives.

The frequency correction circuit 160 which sets the correction period as described above may calculate the frequency of the oscillator clock signal OSC_CLK at each time the correction period arrives, and may perform an operation meas (see FIG. 2) of comparing the preset target frequency and the calculated frequency.

The frequency correction circuit 160 may integrate the number of waves of the oscillator clock signal OSC_CLK during one period T of the RTC signal received from the host 10, as shown in FIG. 3, and may calculate the frequency of the oscillator clock signal OSC_CLK by using the integrated number of waves.

If there is a frequency deviation between the frequency of the oscillator clock signal OSC_CLK calculated as described above and the target frequency, as shown in FIG. 2, the frequency correction circuit 160 may generate the correction signal trim at each of at least two correction periods step 1, step 2 and step 3 (see FIG. 2), and may output the correction signal trim to the oscillator 150. The correction signal may include a code for increasing or decreasing the frequency of the oscillator clock signal OSC_CLK according to the frequency deviation.

In an embodiment, when the vertical synchronizing signal Vsync is a vertical synchronizing signal corresponding to a low scan rate, the frequency correction circuit 160 may generate the correction signal trim at least two times during one period of the vertical synchronizing signal Vsync as shown in FIG. 2. In other words, since the frequency correction circuit 160 may correct the frequency of the oscillator clock signal OSC_CLK during a vertical blank interval of one frame, the frequency of the oscillator clock signal OSC_CLK may be stabilized in a next frame. The stabilization may mean a state in which the frequency deviation between the frequency of the oscillator clock signal OSC_CLK and the target frequency is zero or below a predetermined reference.

In an embodiment, the frequency correction circuit 160 may check a level of the data enable signal DE received from the host 10, and may generate the correction signal trim in the case where the correction period arrives when the data enable signal DE is at a low level.

The frequency correction circuit 160 may skip the generation of the correction signal trim in the case where the correction period arrives when the data enable signal DE is at a high level (see a circular dotted line of FIG. 2).

In other words, when the correction period arrives during a frame active interval in which the display driving circuit outputs image data of one frame to the display panel 110, the frequency correction circuit 160 may skip the generation of the correction signal trim in order for stable operation of the display driving circuit.

As is apparent from the above description, the display driving circuit may correct the frequency change of the oscillator clock signal OSC_CLK by using the PWM synchronizing signal PWM_sync as an internal signal with a period shorter than the vertical synchronizing signal Vsync received from the external circuit. Therefore, even when the display device 100 is driven at a low scan rate, it is possible to quickly correct the frequency change of the oscillator clock signal OSC_CLK.

Hereinafter, a process of correcting the frequency of the oscillator clock signal OSC_CLK by using the display driving circuit will be described.

Figure 4:
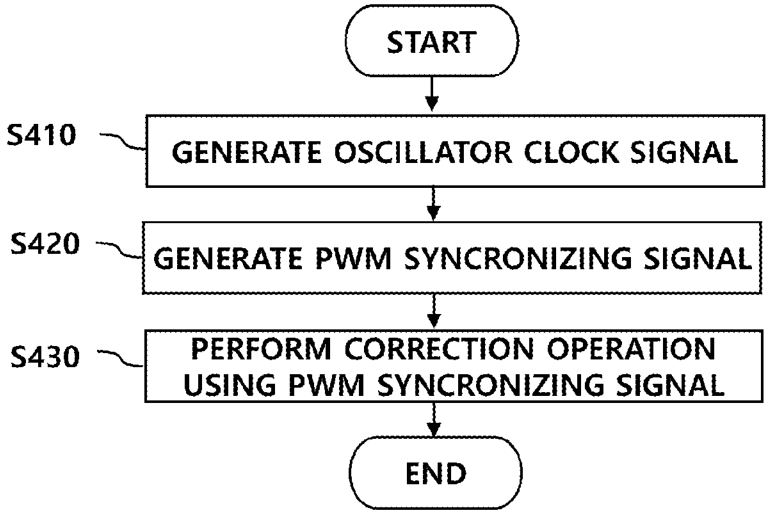
FIG. 4 is a flowchart illustrating a process in which a display driving circuit in accordance with an embodiment corrects an oscillator clock signal.

FIG. 4 is a flowchart illustrating a process in which a display driving circuit in accordance with an embodiment corrects an oscillator clock signal.

The display driving circuit including the source driver 120, the gate driver 130, the timing controller 140, the oscillator 150 and the frequency correction circuit 160 may generate an oscillator clock signal (S410). At the step S410, the display driving circuit may receive a vertical synchronizing signal, a horizontal synchronizing signal, a data enable signal and an RTC signal from the host 10.

The display driving circuit may generate a PWM synchronizing signal by using the oscillator clock signal (S420), and may correct a frequency of the oscillator clock signal by using the PWM synchronizing signal (S430).

At the step S420, the display driving circuit may generate the PWM synchronizing signal by using at least one of the vertical synchronizing signal, the horizontal synchronizing signal and the data enable signal.

At the step S430, the display driving circuit may calculate a correction period by multiplying the period of the PWM synchronizing signal by a natural number equal to or greater than 2, and may correct the frequency of the oscillator clock signal according to the correction period.

In detail, when the correction period arrives at the step S430, the display driving circuit may integrate the number of waves of the oscillator clock signal during one period of the RTC signal which is received from the host 10.

The display driving circuit may calculate the frequency of the oscillator clock signal by using the integrated number of the waves, and may calculate a frequency deviation between the frequency of the oscillator clock signal and a preset target frequency.

The display driving circuit may calculate the frequency deviation during one correction period. When the correction period arrives again, the display driving circuit may generate the oscillator clock signal by increasing or decreasing the frequency of the oscillator clock signal according to the frequency deviation. Then, the display driving circuit may calculate again the frequency deviation between the frequency of the oscillator clock signal and the target frequency.

The display driving circuit may repeatedly perform, at each of at least two correction periods, the process of calculating again the frequency deviation after increasing or decreasing the frequency of the oscillator clock signal. Through this, the display driving circuit may perfectly correct the frequency deviation between the frequency of the oscillator clock signal and the target frequency.

When the correction period arrives after the frequency deviation is corrected, the display driving circuit may calculate the frequency of the oscillator clock signal, and perform the operation meas (see FIG. 2) of comparing the preset target frequency and the calculated frequency.

Meanwhile, at the step S430, the display driving circuit may identify the level of the data enable signal. In a case when the correction period arrives when the level of the data enable signal is low, the display driving circuit may generate a correction signal. In a case when the correction period arrives when the level of the data enable signal is high, the display driving circuit may skip generating a correction signal (marked with a circle in dotted line in FIG. 2).

What is claimed is:

1. A display driving circuit comprising:
an oscillator configured to generate an oscillator clock signal;
a timing controller configured to generate a pulse width modulation (PWM) synchronizing signal by using the oscillator clock signal; and
a frequency correction circuit configured to:
set a correction period for measuring and correcting a frequency deviation between a frequency of the oscillator clock signal and a target frequency, by using the PWM synchronizing signal,
generate a correction signal for correcting the frequency deviation based on the correction period, and
output the correction signal to the oscillator, wherein
the frequency correction circuit is further configured to receive the oscillator clock signal from the oscillator and a real time clock (RTC) signal, integrate the number of waves of the oscillator clock signal during one period of the RTC signal when the correction period arrives, and calculate an updated frequency of the oscillator clock signal by using the integrated number of waves.

2. The display driving circuit of claim 1, wherein the frequency correction circuit is configured to skip generation of the correction signal in a time section during which a display panel is driven according to a data enable (DE) signal.

3. The display driving circuit of claim 2, wherein the frequency correction circuit is configured to:

receive the data enable (DE) signal, generate the correction signal when the correction period arrives and when the data enable signal is at a first level, and skip generation of the correction signal when the correction period arrives and when the data enable signal is at a second level, further wherein the second level is higher than the first level.

4. The display driving circuit of claim 1, wherein the PWM synchronizing signal is a signal which is used in adjusting at least one of light emission time and brightness of pixels disposed in the display panel.

5. The display driving circuit of claim 1, wherein the frequency correction circuit is configured to set the correction period based on a value which is calculated by multiplying a period of the PWM synchronizing signal by a number equal to or greater than 2.

6. The display driving circuit of claim 1, wherein the timing controller is configured to:

receive a vertical synchronizing signal corresponding to a scan rate, and use the vertical synchronizing signal when generating the PWM synchronizing signal, and the frequency correction circuit is configured to generate the correction signal at least two times during one period of the vertical synchronizing signal.

7. The display driving circuit of claim 1, wherein the second level of the data enable signal is configured not to overlap with the correction period.

8. A display comprising the display driving circuit of claim 1.

9. A method of correcting a frequency of an oscillator in a display driving circuit, the method comprising:

generating an oscillator clock signal;

generating a pulse width modulation (PWM) synchronizing signal by using the oscillator clock signal; and correcting a frequency of the oscillator clock signal based on the PWM synchronizing signal, wherein the correcting the frequency comprises:

receiving a real time clock (RTC) signal;

integrating the number of waves of the oscillator clock signal during one period of the RTC signal; and calculating an updated frequency of the oscillator clock signal by using the integrated number of the waves, and the display driving circuit is configured to skip correction of the frequency of the oscillator clock signal during a time section during which a display panel is driven according to a data enable signal.

10. The method of claim 9, wherein in the correcting, the display driving circuit is configured to calculate a correction period by multiplying a period of the PWM synchronizing signal by a number equal to or greater than 2, and correct the frequency of the oscillator clock signal according to the correction period.

11. The method of claim 10, wherein when the correction period arrives and when the level of a data enable signal is at a first level, the display driving circuit is configured to correct the frequency of the oscillator clock signal, when the correction period arrives and when the level of the data enable signal is at a second level, the display driving circuit is configured to skip correction of the frequency of the oscillator clock signal, and the second level is higher than the first level.

12. The method of claim 9, comprising:

calculating a frequency deviation between the frequency of the oscillator clock signal and a target frequency; and generating an updated oscillator clock signal by increasing or decreasing the frequency of the oscillator clock signal according to the frequency deviation when the correcting period arrives again.

13. The method of claim 9, wherein the PWM synchronizing signal is a signal which is used in adjusting at least one of light emission time and brightness of pixels disposed in a display panel.

14. The method of claim 9, wherein in the generating of the PWM synchronizing signal, the display driving circuit is configured to receive a vertical synchronizing signal corresponding to a scan rate, and generate the PWM synchronizing signal by using the oscillator clock signal and the vertical synchronizing signal.

15. A frequency correction circuit in a display driving circuit, wherein the frequency correction circuit is configured to (i) set a correction period for measuring and correcting a frequency deviation between a frequency of an oscillator clock signal and a target frequency, by using a PWM synchronizing signal generated by a timing controller, (ii) generate a correction signal for correcting a frequency deviation based on a correction period, and (iii) output the correction signal to the oscillator, and wherein the frequency correction circuit is further configured to skip generation of the correction signal in a time section during which a display panel is driven according to a data enable (DE) signal.

16. The frequency correction circuit of claim 15, wherein the frequency correction circuit is configured to receive the oscillator clock signal from the oscillator and a real time clock (RTC) signal, integrate the number of waves of the oscillator clock signal during one period of the RTC signal when the correction period arrives, and calculate the frequency of the oscillator clock signal by using the integrated number of waves.

17. The frequency correction circuit of claim 15, wherein the frequency correction circuit is configured to set the correction period based on a value which is calculated by multiplying a period of the PWM synchronizing signal by a number equal to or greater than 2.

18. The frequency correction circuit of claim 15, wherein the frequency correction circuit is configured to:

receive the data enable (DE) signal, generate the correction signal when the correction period arrives and when the data enable signal is at a first level, skip generation of the correction signal when the correction period arrives and when the data enable signal is at a second level, and the second level is higher than the first level.

19. A display comprising the frequency correction circuit of claim 15.

* * * * *